(12) United States Patent
Yokohashi

(10) Patent No.: US 11,579,818 B2
(45) Date of Patent: Feb. 14, 2023

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Mami Yokohashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/224,143

(22) Filed: Apr. 7, 2021

(65) Prior Publication Data

US 2022/0091795 A1 Mar. 24, 2022

(30) Foreign Application Priority Data

Sep. 18, 2020 (JP) .............................. JP2020-157229

(51) Int. Cl.
*G06F 3/12* (2006.01)
(52) U.S. Cl.
CPC .......... *G06F 3/1208* (2013.01); *G06F 3/1255* (2013.01); *G06F 3/1256* (2013.01); *G06F 3/1204* (2013.01)

(58) Field of Classification Search
CPC .... G06F 3/1208; G06F 3/1255; G06F 3/1256; G06F 3/1205; G06F 3/1204
USPC ........................................................ 358/1.9
See application file for complete search history.

(56) References Cited

U.S. PATENT DOCUMENTS

| | | | |
|---|---|---|---|
| 7,444,394 B2* | 10/2008 | Igarashi ................. | H04L 41/22 |
| | | | 709/224 |
| 2010/0003467 A1* | 1/2010 | Moronuki .............. | B41M 5/405 |
| | | | 156/280 |
| 2012/0206745 A1* | 8/2012 | Shibuya ............... | H04N 1/6033 |
| | | | 358/1.9 |

FOREIGN PATENT DOCUMENTS

| | | |
|---|---|---|
| JP | 2008244629 | 10/2008 |
| JP | 2012169866 | 9/2012 |

\* cited by examiner

*Primary Examiner* — Darryl V Dottin
(74) *Attorney, Agent, or Firm* — JCIPRNET

(57) ABSTRACT

An information processing apparatus includes a processor configured to present, to a user, a second sheet on the basis of a visible property of a first sheet and an invisible property of the first sheet, the second sheet being different from the first sheet.

20 Claims, 11 Drawing Sheets

FIG. 5

| SHEET NAME | SHEET TYPE | BASIS WEIGHT [gsm] | SMOOTHNESS [sec] | ELECTRIC RESISTANCE [logΩ] | PAPER WHITENESS Lab |
|---|---|---|---|---|---|
| SHEET A | UNCOATED | 120 | 50 | 10.0 | 90, 1, 2 |
| SHEET B | COATED | 120 | 5000 | 11.1 | 91, 1, -3 |
| SHEET C | COATED | 150 | 5000 | 11.3 | 91, 1, -3 |
| SHEET D | COATED | 80 | 4000 | 12.5 | 89, -2, 4 |
| SHEET E | COATED | 120 | 4000 | 12.4 | 89, -2, 4 |

FIG. 13

Recommended sheets

Found sheets are:

| Sheet name | Sheet type | Basis weight | ... |
|---|---|---|---|
| Sheet A | Coated sheet | 81 | |
| Sheet B | Coated sheet | 90 | |
| Sheet C | Coated sheet | 95 | |
| Sheet D | Coated sheet | 80 | |
| | | | |

Color

↑ Close to target

↕

↓ Close to sheet that is being used

~56

[Search option]  [End]

FIG. 14

| Search option | | |
|---|---|---|
| Search item | Allowable range | |
| | Close | Far |
| ■ Basis weight | (slider mid) | |
| □ Thickness | (slider right) | |
| ■ Sheet type | (slider left) | |
| ■ Smoothness | (slider mid) | |

~58

[Search again]  [End]

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-157229 filed Sep. 18, 2020.

BACKGROUND

(i) Technical Field

The present disclosure relates to an information processing apparatus and a non-transitory computer readable medium.

(ii) Related Art

Japanese Unexamined Patent Application Publication No. 2008-244629 describes an apparatus that causes the color on a recording medium, which is formed by applying a color material to the recording medium, to match the color of a target. The apparatus sets a correction target value that approaches the ground color of the recording medium, which is to be color-matched, as the amount of application of the color material decreases, while the correction target value follows the color of the target in an area having a large amount of application of the color material. The apparatus corrects the amount of application of the color material on the basis of the amount of deviation between the color indicated by a measured color value and the color indicated by the correction target value. The measured color value is obtained by performing printing on the recording medium, which is to be color-matched, and measuring the color of the print.

Japanese Unexamined Patent Application Publication No. 2012-169866 describes an image processing apparatus that extracts image forming media, which may be used as a medium whose color reproduction characteristics approximate those of a medium that is being used, on the basis of a feature value calculated from spectral reflectance characteristics of the medium, which is being used and which is an image forming medium having been set in the image forming apparatus.

In printing an image on a sheet, a user may want to use a sheet different from a certain sheet (for example, a sheet owned by the user or a sheet which the user is going to use).

SUMMARY

Aspects of non-limiting embodiments of the present disclosure relate to a mechanism of presenting, to a user, different sheets by using properties of the certain sheet.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to present, to a user, a second sheet on the basis of a visible property of a first sheet and an invisible property of the first sheet. The second sheet is different from the first sheet.

BRIEF DESCRIPTION OF THE DRAWINGS

Exemplary embodiment of the present disclosure will be described in detail based on the following figures, wherein:

FIG. 5 is a diagram illustrating a sheet database;

FIG. 13 is a diagram illustrating a user interface;

FIG. 14 is a diagram illustrating a user interface; and

DETAILED DESCRIPTION

Figure 1:
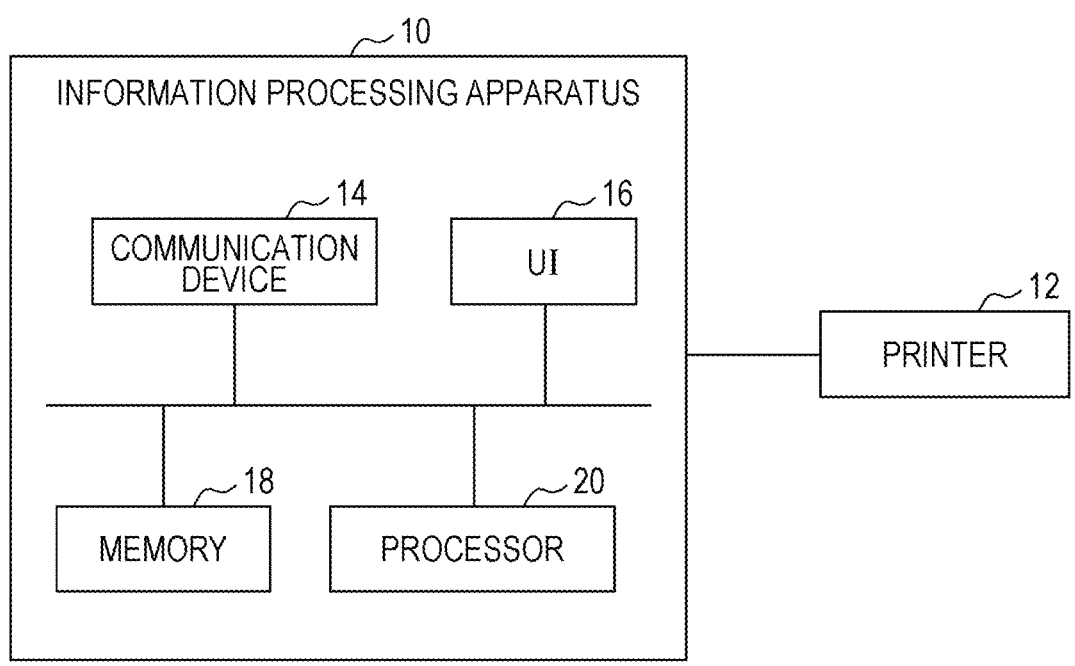
FIG. 1 is a block diagram illustrating the configuration of an information processing system according to the present exemplary embodiment.

Referring to FIG. 1, an information processing system according to the present exemplary embodiment will be described. FIG. 1 illustrates an exemplary configuration of the information processing system according to the present exemplary embodiment.

For example, the information processing system according to the present exemplary embodiment includes an information processing apparatus 10 and a printer 12. The information processing apparatus 10 and the printer 12 have, for example, functions of communicating with different apparatuses through communication paths, such as a local area network (LAN) and the Internet. The information processing system may include a different apparatus (for example, a server).

The information processing apparatus 10 is, for example, a personal computer (hereinafter referred to as a "PC"), a workstation, a tablet PC, a smartphone, or a cellular phone.

The printer 12 is an apparatus that prints images on sheets, which are exemplary recording media. Instead of the printer 12, the information processing system may include a multifunction device including a printer and a scanner. As described below, properties of the printer 12 may be evaluated. However, the case in which properties of the printer 12 are not evaluated does not necessarily involve the printer 12 included in the information processing system.

The information processing apparatus 10 may be separate from the printer 12 or a multifunction device, or may be incorporated in the printer 12 or a multifunction device.

Referring to FIG. 1, the hardware configuration of the information processing apparatus 10 will be described. The information processing apparatus 10 includes, for example, a communication device 14, a user interface (UI) 16, a memory 18, and a processor 20.

The communication device 14 serves as a communication interface having a communication chip, a communication circuit, or the like, and has a function of transmitting information to other apparatuses and a function of receiving information transmitted from other apparatuses. The communication device 14 may perform wired or wireless communication.

The UI 16, which is a user interface, includes a display and an operation apparatus. The display is, for example, a liquid-crystal display or an electroluminescence (EL) display. The operation apparatus includes a keyboard, input keys, a mouse, and an operation panel. The UI 16 may be, for example, a touch panel serving as a display and an operation apparatus.

The memory 18 is a device formed of one or more storage areas in which various types of information are stored. The memory 18 is, for example, a hard disk drive, various memories (for example, a RAM: random-access memory, a DRAM: dynamic random access memory, and a ROM: read-only memory), other storage devices (for example, an optical disk), or a combination of these. The information processing apparatus 10 includes one or more memories 18.

The processor 20 controls operations of the units of the information processing apparatus 10. The processor 20 may have a memory.

In the present exemplary embodiment, on the basis of properties of a sheet, the processor 20 presents other sheets different from the sheet.

The processor 20 may present, to a user, sheets by using the color of a predetermined target as a reference. The target is used to evaluate, for example, the properties of sheets and the print properties of the printer 12. For example, the processor 20 presents, to a user, sheets by using, as a reference, the white color determined in the target. The target may be used to evaluate the print properties of the printer 12 on the basis of the difference between the color of an image, which is printed on a sheet by the printer 12, and the color of the target. The target is used in a color management system (CMS), and may be, for example, an International Color Consortium (ICC) profile (for example, an ICC profile such as Japan Color 2011) based on ICC.

Figure 2:
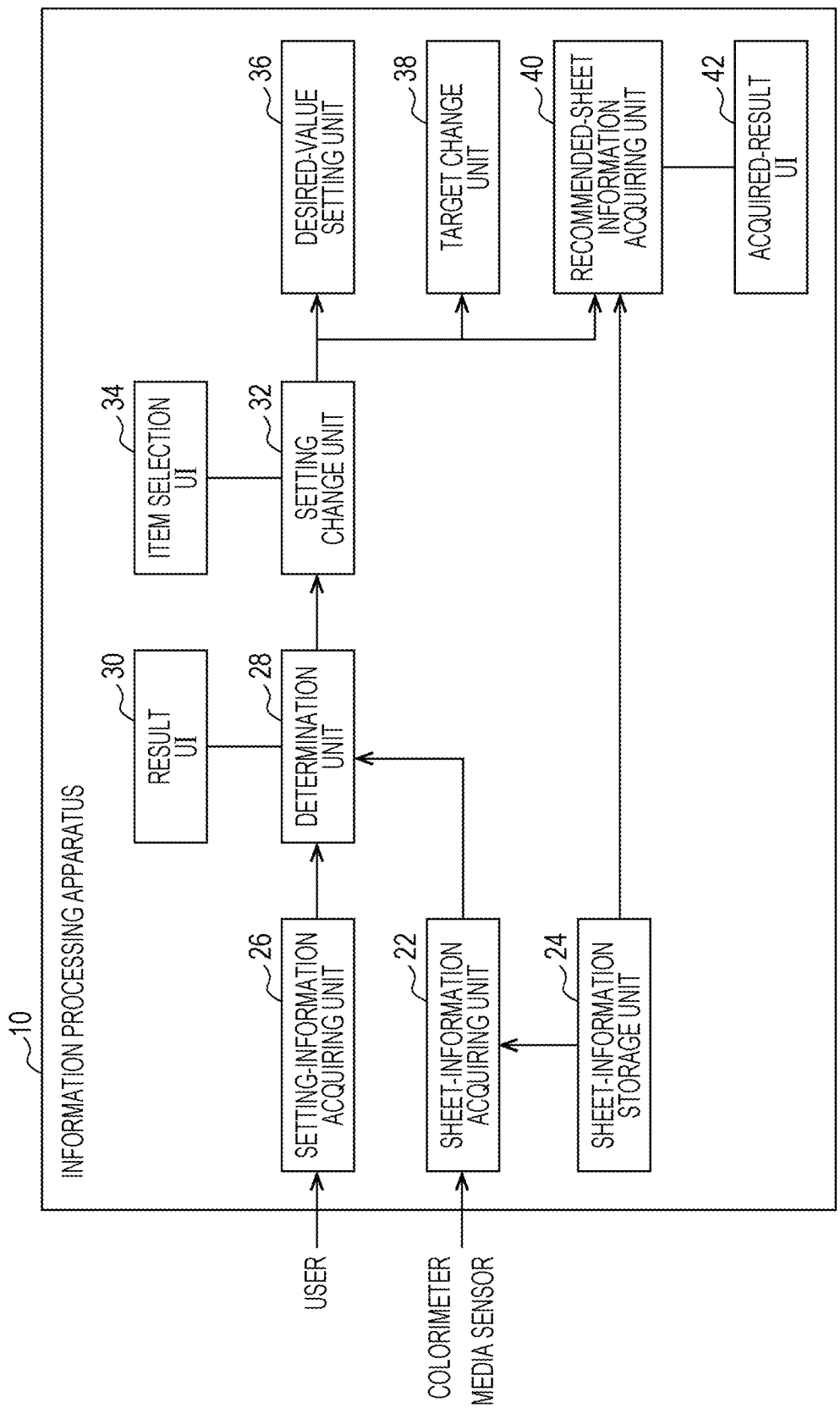
FIG. 2 is a block diagram illustrating the functional configuration of an information processing apparatus according to the present exemplary embodiment.

Referring to FIG. 2, functions of the information processing apparatus 10 will be described. FIG. 2 illustrates the functional configuration of the information processing apparatus 10. The functions illustrated in FIG. 2 are implemented by the processor 20. This implementation may involve the memory 18.

A sheet-information acquiring unit 22 acquires information (hereinafter referred to as "sheet information") indicating properties of sheets. The properties of a sheet include, for example, visible sheet properties and invisible sheet properties.

The visible sheet properties describe a look or appearance of a sheet. For example, the concept of visible sheet properties encompasses the color of a sheet (for example, the Lab value of the paper whiteness), the basis weight, the weight, and the thickness of a sheet, the type of a sheet (hereinafter referred to as the "sheet type", and, for example, a coated sheet, an uncoated sheet, a matt coated sheet, or an embossed sheet), and the surface nature (for example, an embossing pattern and the state of its texture). At least one of the properties is used as a visible sheet property. For example, at least one of the properties, the weight or basis weight of a sheet and the sheet type, is used as a visible sheet property.

The invisible sheet properties, which are other than properties about the look of a sheet, describe, for example, capability of the printer 12, which is to be used. For example, the properties about the capability of the printer 12 influence the printing capability of the printer 12. For example, the concept of invisible sheet properties encompasses properties which influence the transfer capability (for example, the electric resistance of a sheet), properties which influence the print density (for example, the smoothness of a sheet), and properties which influence the capability of sheet transfer (for example, the bending resistance of a sheet). At least one of the properties is used as an invisible sheet property. For example, at least the smoothness of a sheet is used as an invisible sheet property.

A property of a sheet may belong both to the visible property and to the invisible property of the sheet. For example, coating and smoothness are properties about the appearance of a sheet and are, at the same time, properties which influence the printing capability. Such properties are handled as visible properties or invisible properties of the sheet.

Sheet properties may be classified in accordance with whether the properties influence the printing capability of the printer 12. For example, the sheet properties may be classified into the property that influences the transfer capability and the property that does not influence the transfer capability.

For example, a sheet color (for example, the Lab value of the paper whiteness) is measured by using a colorimeter. The sheet-information acquiring unit 22 acquires information indicating the measurement value. Other properties of the sheet are measured by using a media sensor. The sheet-information acquiring unit 22 acquires information indicating the measured properties. For the sake of description, a sheet, whose properties are measured by using a colorimeter and a media sensor, is referred to as a "first sheet" below. A first sheet is, for example, a sheet used by a user or a sheet used by the printer 12. As a matter of course, these are exemplary sheets. A sheet other than these may be a first sheet. A user may input sheet information indicating the properties of the first sheet. The sheet-information acquiring unit 22 may acquire sheet information which is input by the user.

In the case of use of the target, the sheet-information acquiring unit 22 acquires target information indicating properties of the target. The target information is, for example, an ICC profile. The sheet-information acquiring unit 22 may acquire target information that is input by a user, or may acquire target information from an apparatus (for example, a server or a storage medium) in which target information is stored.

The sheet-information acquiring unit 22 acquires sheet information from a sheet-information storage unit 24, which is described below.

The sheet-information storage unit 24, which is a sheet database (DB), stores, for example, sheet information of multiple sheets. The sheet-information storage unit 24 may be included in the information processing apparatus 10, or may be included in an apparatus (for example, a server or an apparatus in the cloud) other than the information processing apparatus 10.

A setting-information acquiring unit 26 acquires setting information about sheet properties which is set by a user. For example, setting information about properties which describes the respective levels desired by a user is input by using the UI 16 or the user's terminal apparatus (for example, a PC), and the setting-information acquiring unit 26 acquires the input setting information.

A determination unit 28 determines whether a sheet is usable. For example, the determination unit 28 determines whether a sheet is printable by using the printer 12, on the basis of the capability of the printer 12. As another example, the determination unit 28 may determine whether a sheet is usable in the CMS. The determination result is displayed as a result UI 30 on the display of the information processing apparatus 10 or a user's terminal apparatus.

A setting change unit 32 changes various settings. For example, an item selection UI 34 for a user's selection of an item that is to be changed is provided to the user. For example, the item selection UI 34 is displayed on the display of the information processing apparatus 10 or the user's terminal apparatus. An item to be changed is, for example, "desired value", "target", or "change of the sheet". A desired value is, for example, a value indicating an allowable range of the difference between a color of a sheet and a color (for example, a white color) determined in the target. Change of the sheet involves presentation, to the user, of sheets (hereinafter referred to as "recommended sheets") that are recommended.

A desired-value setting unit 36 changes a desired value. For example, when "desired value" is selected on the item selection UI 34 as an item that is to be changed, the desired-value setting unit 36 changes the desired value.

A target change unit 38 changes the target. For example, when "target" is selected as an item that is to be changed, the target change unit 38 changes the target.

A recommended-sheet information acquiring unit 40 acquires, for output, sheet information of the recommended sheets. For example, the determination unit 28 searches for recommended sheets, which are different from the first sheet, on the basis of the visible properties of the first sheet and the invisible properties of the first sheet. More specifically, the determination unit 28 searches the sheet DB, which is the sheet-information storage unit 24, for recommended sheets having the visible properties whose differences from those of the first sheet fall in corresponding first allowable ranges and having the invisible properties whose differences from those of the first sheet fall in corresponding second allowable ranges. The recommended-sheet information acquiring unit 40 acquires sheet information of the found recommended sheets from the sheet-information storage unit 24. The information about the recommended sheets is provided to a user as an acquired-result UI 42. For example, the information about the recommended sheets is displayed on the display of the information processing apparatus 10 or the user's terminal apparatus.

Figure 3:
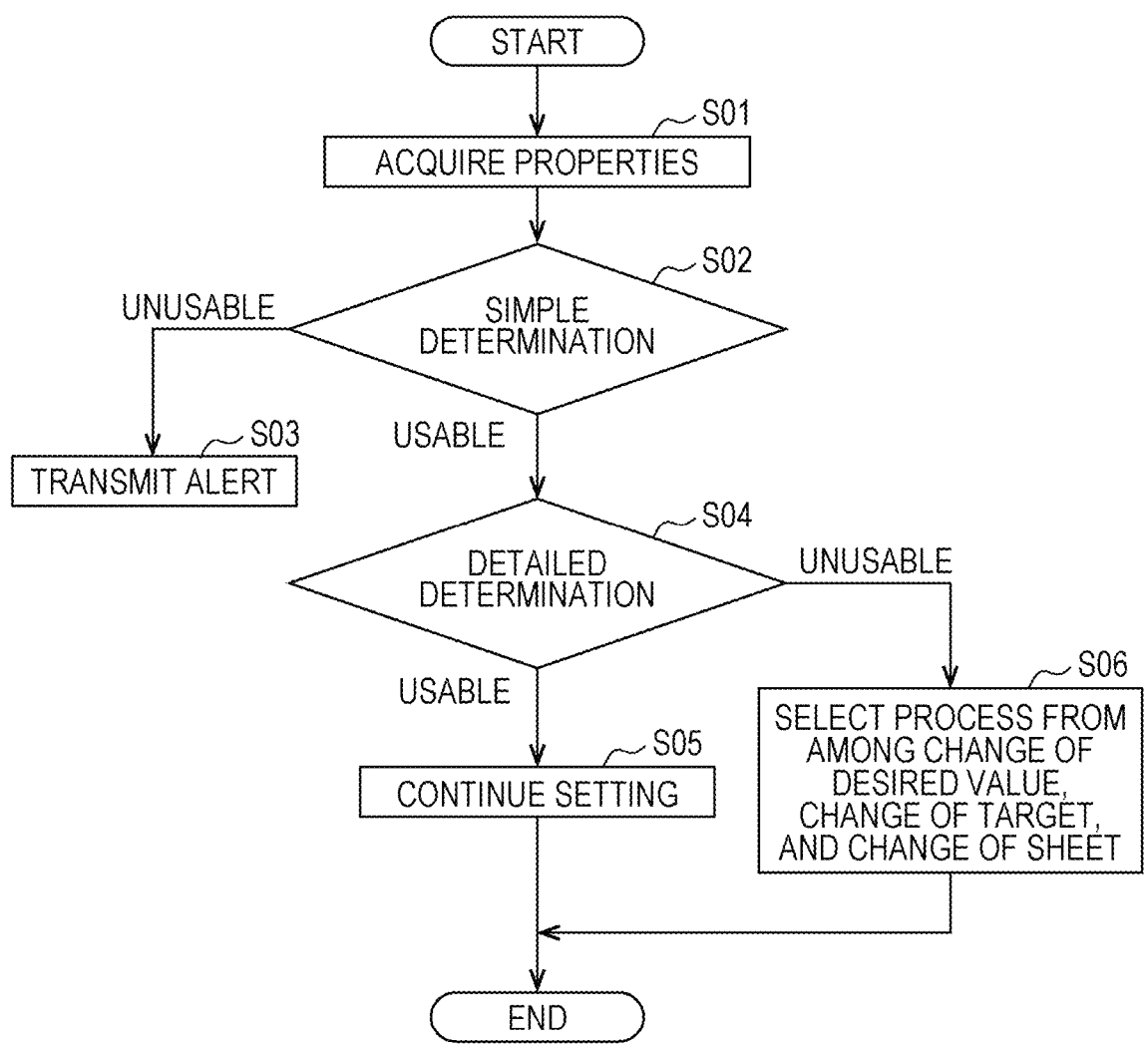
FIG. 3 is a flowchart illustrating the overview of a process according to the present exemplary embodiment.

Referring to FIG. 3, the overview of a process performed by the information processing apparatus 10 will be described below. FIG. 3 is a flowchart illustrating the overview of the process. In this example, the target is used.

The sheet-information acquiring unit 22 acquires sheet information indicating the properties of the first sheet (S01). For example, the first sheet is a sheet used by a user or used by the printer 12. In the case of use of the target, the sheet-information acquiring unit 22 acquires target information indicating the properties of the target.

The determination unit 28 performs a simple determination process (S02). The simple determination process is a process of determining, in a simple manner, whether the first sheet is usable.

For example, the determination unit 28 determines whether the first sheet is printable by using the printer 12, on the basis of the capability of the printer 12. In this case, the determination unit 28 acquires capability information, which indicates the capability of the printer 12, from the printer 12 or a difference apparatus (for example, a server). On the basis of the capability indicated by the capability information, the determination unit 28 determines whether the first sheet is printable by using the printer 12. For example, in the case where the printer 12 does not have a capability of printing a cardboard and where the first sheet corresponds to a cardboard, the determination unit 28 determines that the first sheet is not printable by using the printer 12. In this case, the determination unit 28 outputs alert information indicating an alert (S03). The alert information is displayed, for example, on a display. If the determination unit 28 determines that the first sheet is printable by using the printer 12, the process proceeds to step S04.

In addition, the determination unit 28 determines whether the first sheet is usable in the CMS. For example, if the color of the first sheet is black, which is not suitable for the CMS, the determination unit 28 determines that the first sheet is not usable in the CMS. In this case, the determination unit 28 outputs alert information indicating an alert (S03). If the determination unit 28 determines that the first sheet is usable in the CMS, the process proceeds to step S04.

In step S04, the determination unit 28 performs a detailed determination process (S04). The detailed determination process is a process of determining whether the first sheet is usable, on the basis of the properties of the first sheet (that is, the visible properties and the invisible properties of the first sheet) and the properties of the target.

For example, if the difference between the properties of the first sheet and the properties of the target falls in the corresponding allowable range, the determination unit 28 determines that the first sheet is usable. In this case, the process proceeds to step S05, and, for example, the subsequent setting is continued (S05).

If the difference between the properties of the first sheet and the properties of the target does not fall in the corresponding allowable range, the determination unit 28 determines that the first sheet is not usable. In this case, the process proceeds to step S06, and any of the processes, that is, change of the desired value, change of the target, and change of the sheet, is selected. For example, the user performs the selection. The selected process is performed. For example, the desired value is changed, the target is changed, or recommended sheets are presented to the user.

Figure 4:
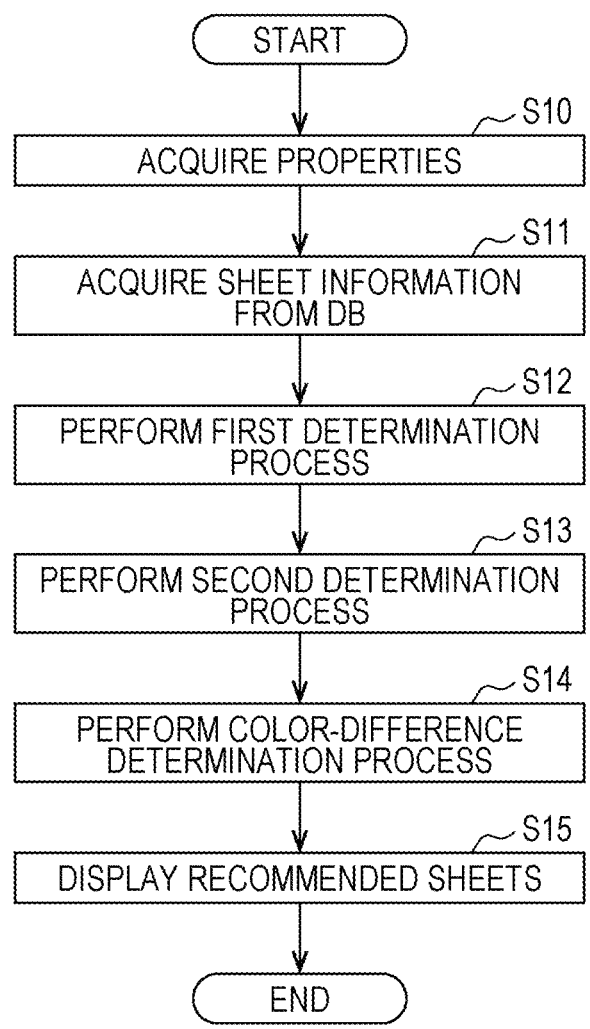
FIG. 4 is a flowchart illustrating a detailed process according to the present exemplary embodiment.

Referring to FIG. 4, a detailed process performed by the information processing apparatus 10 will be described below. FIG. 4 is a flowchart of the detailed process. In this example, the target is used, and recommended sheets are presented to a user.

The sheet-information acquiring unit 22 acquires sheet information indicating the properties of the first sheet, and acquires target information indicating a property (for example, the paper whiteness determined in the target) of the target (S10).

The sheet-information acquiring unit 22 acquires sheet information of the sheets stored in the sheet-information storage unit 24, which is a sheet DB (S11).

The determination unit 28 performs a first determination process (S12). In the first determination process, the determination unit 28 searches the sheet-information storage unit 24, which is the sheet DB, for one or more sheets having properties whose differences from the visible properties of the first sheet fall in the respective first allowable ranges. Hereinafter, for the sake of description, one or more sheets that are found in the first determination process are referred to as a "first search result". The first allowable ranges may be changed by the user.

The determination unit 28 performs a second determination process (S13). In the second determination process, the determination unit 28 searches the first search result for one or more sheets having properties whose differences from the invisible properties of the first sheet fall in the respective second allowable ranges. The second allowable ranges may be changed by the user. Hereinafter, for the sake of description, one or more sheets that are found in the second determination process are referred to as a "second search result".

As described above, the determination unit 28 searches the sheet DB for one or more sheets having properties whose differences from the visible properties of the first sheet fall in the respective first allowable ranges and having properties whose differences from the invisible properties of the first sheet fall in the respective second allowable ranges. Thus, the allowable ranges having different values in accordance with the properties of the first sheet are used to find one or more sheets from the sheet DB.

The determination unit 28 performs a color-difference determination process (S14). In the color-difference determination process, the determination unit 28 searches the second search result for one or more sheets having a color whose difference from the white color, which is determined in the target, falls in a third allowable range. The third allowable range may be changed by the user. Hereinafter, for the sake of description, one or more sheets found in the color-difference determination process are referred to as a "third search result".

The one or more sheets found in the color-difference determination process (that is, the third search result) are presented to the user as recommended sheets. For example, information about the recommended sheets is displayed on a display (S15).

In the case of no use of the target, the second search result may be presented to the user as recommended sheets. That is, the one or more sheets, having properties whose differences from the visible properties of the first sheet fall in the respective first allowable ranges and having properties whose differences from the invisible properties of the first sheet fall in the respective second allowable ranges, may be presented to the user as recommended sheets. For example, information about the recommended sheets is displayed on a display.

Referring to FIG. 5, a concrete example of the sheet DB will be described. FIG. 5 illustrates an exemplary sheet DB. The information illustrated in FIG. 5 is stored in the sheet-information storage unit 24.

For example, the sheet DB stores information in which, for each sheet, information indicating its sheet name, information indicating its sheet type, the value of its basis weight, the value of its smoothness, the value of its electric resistance, and the value of its paper whiteness (for example, Lab) are associated with each other. These types of information, which are associated with each other in advance, are registered in the database.

A concrete example will be described. Sheet A is an uncoated sheet, has a basis weight of 120 gsm, has a smoothness of 50 sec, has an electric resistance of 10.0 log Ω, and has a value of whiteness of sheet A (for example, Lab) of (90, 1, 2).

Figure 6:
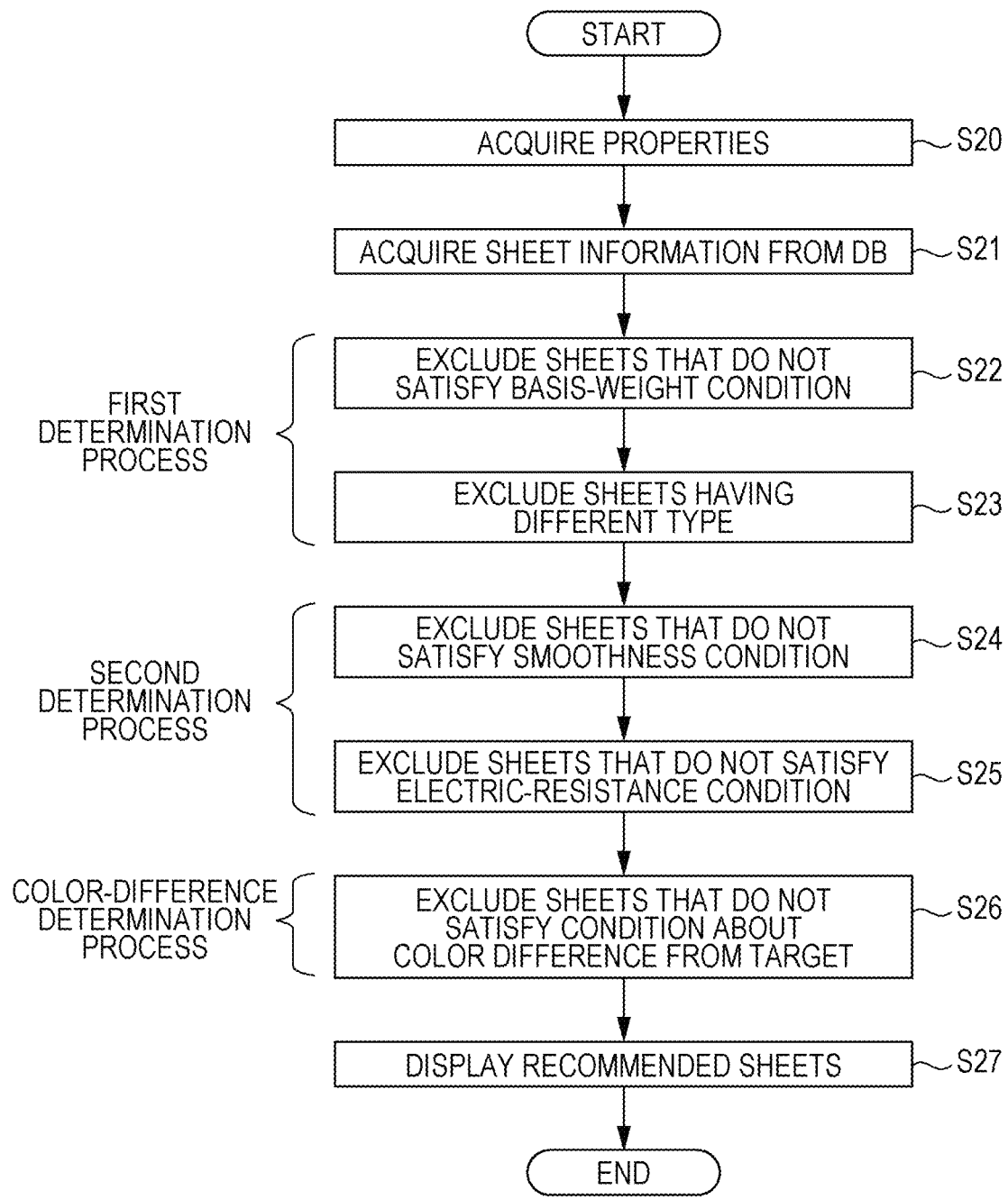
FIG. 6 is a flowchart of a concrete example of a process according to the present exemplary embodiment.
Figure 7:
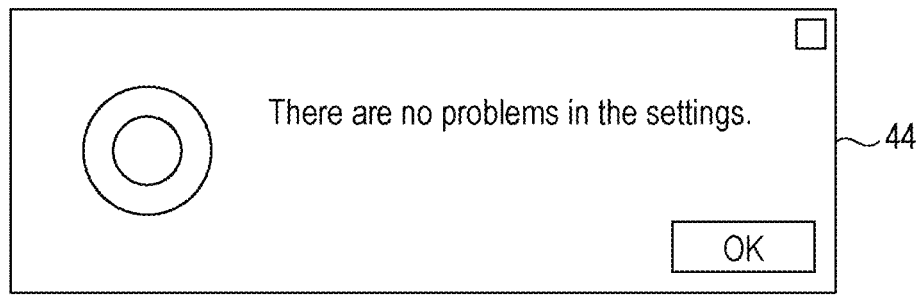
FIG. 7 is a diagram illustrating a user interface.
Figure 8:
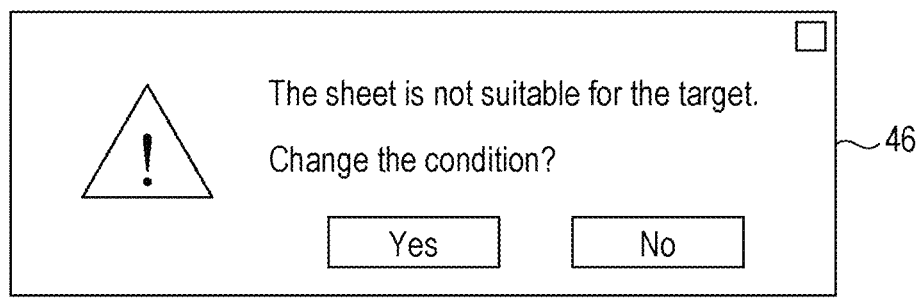
FIG. 8 is a diagram illustrating a user interface.

Referring to FIG. 6, a concrete example according to the present exemplary embodiment will be described. FIG. 6 is a flowchart of the concrete example. FIG. 6 illustrates a concrete example of the process illustrated in FIG. 4.

The sheet-information acquiring unit 22 acquires sheet information indicating the properties of the first sheet, and acquires target information indicating a property (for example, the paper whiteness determined in the target) of the target (S20).

The sheet-information acquiring unit 22 acquires sheet information about the sheets stored in the sheet-information storage unit 24, which is the sheet DB (S21).

The determination unit 28 performs the first determination process. The first determination process includes the processes in steps S22 and S23. The order of steps S22 and S23 may be reversed. A concrete example of the first determination process will be described. The values described below are merely exemplary. The values may be changed by a user, or may be changed in accordance with the printer 12, which is to be used. The same is true for the values used in the second determination process and the color-difference determination process.

The determination unit 28 excludes sheets that do not satisfy a condition about the basis weight relative to the first sheet, from the sheets registered in the sheet DB (S22). Specifically, the determination unit 28 excludes the sheets, which have a basis weight whose difference from that of the first sheet falls out of the range between −10 gsm to +10 gsm, from the sheets registered in the sheet DB. In other words, the determination unit 28 searches, for extraction, the sheets, which are registered in the sheet DB, for the sheets having a basis weight whose difference from that of the first sheet falls in the range between −10 gsm to +10 gsm. The range between −10 gsm to +10 gsm corresponds to an exemplary first allowable range.

The determination unit 28 excludes sheets having a sheet type different from that of the first sheet, from the sheets, which are registered in the sheet DB and which have not been excluded in step S22 (S23). In other words, the determination unit 28 searches, for extraction, the sheets, which are registered in the sheet DB and which have been extracted in step S22, for the sheets having the same sheet type as that of the first sheet. For example, if the first sheet is a coated sheet, uncoated sheets are excluded, and coated sheets are searched for and extracted.

The one or more sheets, which have not been excluded in steps S22 and S23, correspond to the first search result described above. That is, the determination unit 28 searches, for extraction, the sheets, which are registered in the sheet DB, for the sheets having a basis weight whose difference from that of the first sheet falls in the range between −10 gsm and +10 gsm and having the same sheet type as that of the first sheet. The one or more extracted sheets correspond to the first search result.

The determination unit 28 performs the second determination process. The second determination process includes steps S24 and S25. The order of steps S24 and S25 may be reversed.

The determination unit 28 excludes sheets that do not satisfy a condition about the smoothness relative to the first sheet, from the one or more sheets, which correspond to the first search result (S24). Specifically, the determination unit 28 excludes the sheets, which have a smoothness whose difference from that of the first sheet falls out of the range between −20% and +20%, from the one or more sheets, which correspond to the first search result. In other words, the determination unit 28 searches, for extraction, the one or more sheets, which correspond to the first search result, for the sheets having a smoothness whose difference from that of the first sheet falls in the range between −20% and +20%. The range between −20% to +20% corresponds to an exemplary second allowable range.

The determination unit 28 excludes sheets that do not satisfy a condition about the electric resistance relative to the first sheet, from the one or more sheets, which correspond to the first search result and which have not been excluded in step S24 (S25). Specifically, the determination unit 28 excludes the sheets, which have an electric resistance whose difference from that of the first sheet is equal to or greater than 13 log Ω, from the one or more sheets, which correspond to the first search result and which have not been excluded in step S24. In other words, the determination unit 28 searches, for extraction, the one or more sheets, which correspond to the first search result and which have been extracted in step S24, for the sheets having an electric resistance whose difference from that of the first sheet is less than 13 log Ω. Having a value less than 13 log Ω corresponds to an exemplary second allowable range.

The one or more sheets that have not been excluded in steps S24 and 25 correspond to the second search result. That is, the determination unit 28 searches, for extraction, the one or more sheets, which correspond to the first search result, for the sheets having a smoothness whose difference from that of the first sheet falls in the range between −20% and +20% and having an electric resistance whose difference from that of the first sheet is less than 13 log Ω. The one or more extracted sheets correspond to the second search result. Further, in other words, the determination unit 28 searches, for extraction, the sheets, which are registered in the sheet DB, for the sheets satisfying the following conditions: the sheets have a basis weight whose difference from that of the first sheet falls in the range between −10 gsm and +10 gsm; the sheets have the same sheet type as that of the first sheet; the sheets have a smoothness whose difference from that of the first sheet falls in the range between −20% to +20%; and the sheets have an electric resistance whose difference from that of the first sheet is less than 13 log Ω. The extracted sheets correspond to the second search result.

The determination unit 28 performs the color-difference determination process (S26). In the color-difference determination process, the determination unit 28 excludes sheets that do not satisfy a condition about the color difference from the target, from the one or more sheets, which correspond to the second search result. Specifically, the determination unit 28 excludes the sheets, which have a color value (for example, a Lab value) whose difference from the value of the white color (for example, the Lab value of the white color) determined in the target falls out of the third allowable range, from the one or more sheets, which correspond to the second search result. In other words, the determination unit 28 searches, for extraction, the one or more sheets, which correspond to the second search result, for sheets having a color value (for example, a Lab value) whose difference from the value of the white color (for example, the Lab value of the white color) determined in the target falls in the third allowable range. The extracted sheets correspond to the third search result.

That is, the determination unit 28 searches, for extraction, the sheets, which are registered in the sheet DB, for sheets satisfying the following conditions: the sheets have a basis weight whose difference from that of the first sheet falls in the range between −10 gsm and +10 gsm; the sheets have the same sheet type as that of the first sheet; the sheets have a smoothness whose difference from that of the first sheet falls in the range between −20% and +20%; the sheets have an electric resistance whose difference from that of the first sheet is less than 13 log Ω; and the sheets have a color value (for example, a Lab value) whose difference from the value of the white color (for example, the Lab value of the white color) determined in the target falls in the third allowable range. The extracted sheets correspond to the third search result.

The order of the first determination process, the second determination process, and the color-difference determination process is not limited to the order described above. The order may be any. That is, the order of steps S22 to S26 is merely exemplary, and any order may be employed.

The one or more sheets, which correspond to the third search result, are presented to the user as recommended sheets (S27). For example, information about recommended sheets (for example, information indicating their sheet names and their properties) is displayed on a display.

If the target is not used (that is, if sheets are searched for without use of the target as a reference), the one or more sheets, which correspond to the second search result, may be presented to the user as recommended sheets. That is, the sheets, which satisfy the following conditions, may be presented to the user as recommended sheets: the sheets have a basis weight whose difference from that of the first sheet falls in the range between −10 gsm to +10 gsm; the sheets have the same sheet type as that of the first sheet; the sheets have a smoothness whose difference from that of the first sheet falls in the range between −20% to +20%; the sheets have an electric resistance whose difference from that of the first sheet is less than 13 log Ω. In addition, the first search result may be presented to the user. Even if the target is used, the first search result and the second search result may be also presented to the user.

Referring to FIGS. 7 to 14, exemplary user interfaces provided to a user will be described below. FIGS. 7 to 14 illustrate exemplary user interfaces provided in the cases. For example, message screens and various-settings screens are displayed as exemplary user interfaces on a display of the information processing apparatus 10 or a user's terminal apparatus.

If it is determined that the first sheet is usable in step 04 in FIG. 3 described above, a screen 44 illustrated in FIG. 7 is displayed on a display. For example, if it is determined that the first sheet is printable by using the printer 12, the screen 44 is displayed. The screen 44 displays a message indicating that "There are no problems in the settings."

If it is determined that the first sheet is not usable (for example, if the difference between the properties of the first sheet and the properties of the target does not fall in the corresponding allowable range) in step S04 in FIG. 3 described above, a screen 46 illustrated in FIG. 8 is displayed on a display. The screen 46 displays a message indicating that "The first sheet is not suitable for the target." The screen 46 also displays a button (for example, a "Yes" button) for transmitting an instruction to change the condition.

Figure 9:
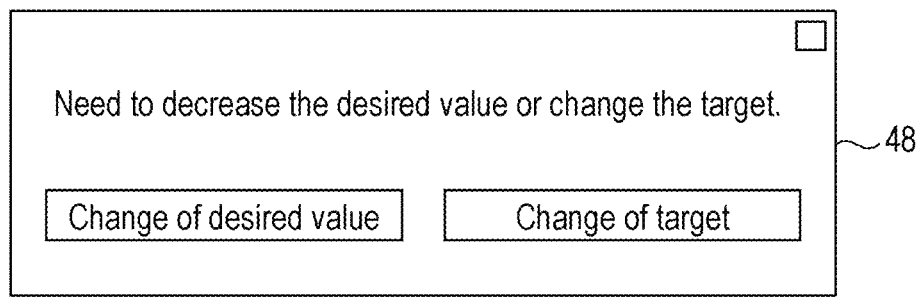
FIG. 9 is a diagram illustrating a user interface.

If the user transmits an instruction to change the condition on the screen 46 (for example, if the user presses the "Yes" button), a screen 48 illustrated in FIG. 9 is displayed on the display. The screen 48 is used by the user to transmit an instruction to change the desired value or the target.

Figure 10:
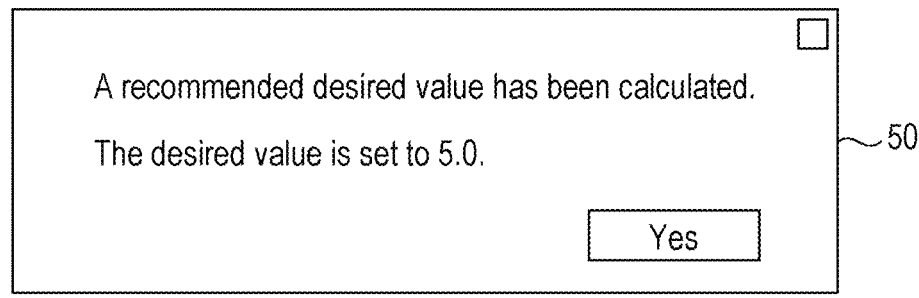
FIG. 10 is a diagram illustrating a user interface.

If the user transmits an instruction to change the desired value on the screen 48 (for example, if the user presses the "Change of desired value" button), a screen 50 illustrated in FIG. 10 is displayed on the display. For example, if a recommended desired value (for example, a desired allowable range) is calculated automatically, the value is displayed on the screen 50. As a matter of course, the user may set the desired value.

Figure 11:
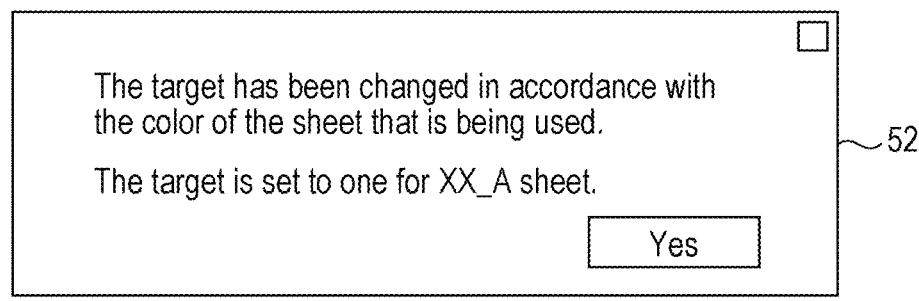
FIG. 11 is a diagram illustrating a user interface.

If the user transmits an instruction to change the target on the screen 48 (for example, if the user presses the "Change of target" button), a screen 52 illustrated in FIG. 11 is displayed on the display. For example, a target, in which the white color whose difference from the color of the first sheet, which is to be used, falls in the corresponding allowable range is determined, is displayed as a recommended target on the screen 52. For example, the name of the target is displayed on the screen 52. If the target is an ICC profile used to evaluate the print properties of the printer 12, information indicating an ICC profile suitable for the color of the first sheet is displayed as information indicating a recommended target.

Figure 12:
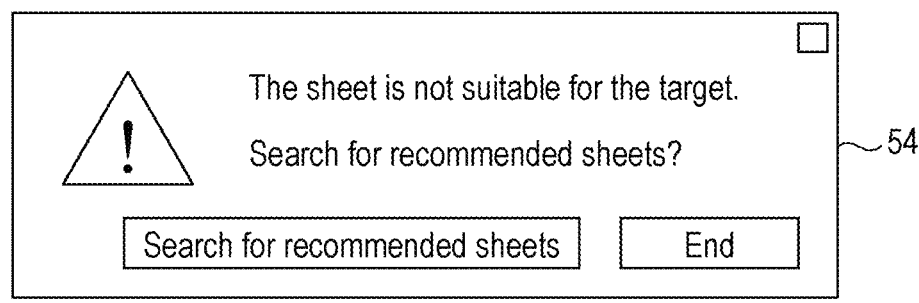
FIG. 12 is a diagram illustrating a user interface.

If the difference between the properties of the first sheet and the properties of the target falls out of the corresponding allowable range, as illustrated in FIG. 12, a screen 54 for transmitting an instruction to search for recommended sheets may be displayed on the display. For example, even when the first sheet is printable by using the printer 12, if the difference between the properties of the first sheet and the properties of the target falls out of the corresponding allowable range, the screen 54 is displayed.

If the user transmits an instruction to search for recommended sheets (for example, if the user presses the "Search for recommended sheets" button), the first determination process, the second determination process, and the color-difference determination process (see FIGS. 4 and 6) are performed. The search result is displayed on the display. For example, a screen 56 illustrated in FIG. 13 is displayed on the display. The screen 56 displays the search result. For example, multiple recommended sheets, which are found, are displayed in the order of a property of the recommended sheets. For example, a recommended sheet having a color closer to the white color determined in the target is displayed higher up in the list; a recommended sheet having a color closer to the color of the first sheet (the sheet that is being used in FIG. 13) is displayed lower down in the list. The display order may be reversed. In the example in FIG. 13, "Sheet A", which has a color closest to the white color determined in the target among the recommended sheets, is displayed at the top.

Regardless of whether the first sheet is usable by the printer 12, the screen 56 illustrated in FIG. 13 may be displayed. For example, the processes in FIGS. 4 and 6 may be performed so that the one or more sheets, which correspond to the third search result, are extracted as recommended sheets and the screen 56, displaying the third search result, is displayed.

The user may set options for searching for recommended sheets. FIG. 14 illustrates a screen 58 for setting search options. The screen 58 is an exemplary user interface for setting allowable ranges for differences from sheet properties, including visible properties and invisible properties of the first sheet, and searching for different sheets having properties falling in the respective allowable ranges. The screen 58 displays search items which indicate sheet properties (for example, visible properties and invisible properties), and also displays the allowable ranges for the properties. In the example in FIG. 14, the basis weight, the thickness, the sheet type, and the smoothness are displayed as search items. These are merely exemplary. Other properties may be displayed as search items, and their allowable ranges may be set.

On the screen 58, the allowable ranges for the search items are changed by a user. For example, the allowable ranges are set in a range from "close" to "far". A "close" property means a small difference from the property of the first sheet. A "far" property means a large difference from the property of the first sheet. For example, the allowable range for the basis weight is set as a relatively "close" property. The allowable range for the thickness is set as a relatively "far" property. A user may change the allowable ranges for the setting items on the screen 58.

The search items are associated with corresponding checkboxes. The search items associated with their checkboxes having been checked by a user are used in the search as search keys for recommended sheets. For example, the checkboxes for the basis weight, the sheet type, and the smoothness are checked, and these are used as search keys. The checkbox for the thickness is not checked. The thickness is not used as a search key.

When a user sets the allowable ranges for the search items on the screen 58 and transmits a search instruction, the processor 20 uses the set search items as search keys, and searches the sheets, which are registered in the sheet DB, for the sheets that are included in the allowable ranges for the search items, as recommended sheets. For example, the first determination process and the second determination process are performed so that recommended sheets are searched for. In the example in FIG. 14, the processor 20 searches, as recommended sheets, for sheets having a basis weight relatively close to that of the first sheet, having the same sheet type as that of the first sheet, and having a smoothness relatively close to that of the first sheet.

On the screen 58, in addition to the allowable ranges for the search items, a user may set the allowable range for the difference from the white color determined in the target. In this case, the color-difference determination process is further performed, and the sheets, which have a color whose difference from the white color determined in the target falls in the allowable range, are searched for as recommended sheets. Without setting of the allowable ranges for the search items, only the allowable range for the difference from the white color determined in the target may be set by a user, and recommended sheets may be searched for.

As an example different from the example in FIG. 14, regardless of the first sheet (that is, without use of the first sheet as a reference), a search screen for searching for recommended sheets may be displayed. The search screen is an exemplary user interface for setting sheet properties, including visible properties and invisible properties of a sheet, and searching, as recommended sheets, for sheets having the set sheet properties.

Like the screen 58, the search screen displays search items (for example, the basis weight, the thickness, the sheet type, and the smoothness) corresponding to sheet properties. On the search screen, instead of the allowable ranges, values or the like of the properties are set for the respective check items. For example, the values of the properties, such as the basis weight, the thickness, and the smoothness, are set, and the sheet type (for example, the coated sheet or the uncoated sheet) is set. The processor 20 searches, as recommended sheets, for the sheets having the properties which are set on the search screen.

Allowable ranges may be set for the set values of the properties. In this case, the processor 20 searches, as recommended sheets, for sheet having properties included in the allowable ranges for the properties. For example, the processor 20 searches, as recommended sheets, for sheets having a basis weight included in the set allowable range for the basis weight, having a thickness included in the set allowable range for the thickness, having a smoothness included in the set allowable range for the smoothness, and having the same sheet type as the set sheet type. The recommended sheets, which are thus found, are not sheets found by using the first sheet as a reference.

Application examples according to the present exemplary embodiment will be described. The application examples described below are merely exemplary. Other application examples may be carried out.

First Application Example

For example, execution of the first determination process and the second determination process (see FIGS. 4 and 6) without use of the target causes the following recommended sheets to be searched for and be presented to a user: the recommended sheets have properties whose differences from the properties of the first sheet (that is, visible properties and invisible properties) fall in the respective allowable ranges. The differences between the recommended sheet properties and the properties of the first sheet are included in the respective allowable ranges. Thus, for example, when an image is printed on a recommended sheet, the print result on the recommended sheet (that is, the finishing on the printed matter) is relatively like the print result on the first sheet. That is, compared with the print result on a sheet having properties whose differences from the properties of the first sheet fall out of the respective allowable ranges, the print result on a recommended sheet is more closely like the print result on the first sheet. In other words, the first determination process and the second determination process are performed so that the sheets, on which the print result is relatively like the print result on the first sheet and which have a color different from that of the first sheet, are presented to a user as recommended sheets. For example, when the first sheet is a sheet which is to be used by a user in the printer 12, the sheets, from which the print result which is relatively like the print result on the sheet is obtained but which have a color different from that of the sheet, are presented as recommended sheets.

Second Application Example

Execution of the first determination process, the second determination process, and the color-difference determination process (see FIGS. 4 and 6) with use of the target causes the following recommended sheets to be searched for and be presented to a user: the recommended sheets have properties whose differences from the properties of the first sheet (that is, visible properties and invisible properties) fall in the respective allowable ranges; and the recommended sheets have a color whose difference from the white color determined in the target falls in the corresponding allowable range. In this case, compared with sheets having a color whose difference from the white color determined in the target falls out of the corresponding allowable range, the sheets, which have a color closer to the white color determined in the target, are presented as recommended sheets.

For example, the target is a profile (for example, an ICC profile) used in evaluation of the print properties of the printer 12. To evaluate the print properties of the printer 12 by using the target, the printer 12 prints an image on a recommended sheet in accordance with the color determined in the target. For example, an image is printed on a recommended sheet instead of the first sheet. For example, the target indicates, for each color value, the correspondence between CMYK components (including the cyan (C) component, the magenta (M) component, the yellow (Y) component, and the black (K) component) and a Lab value on a color space which is independent of devices, such as printers and displays. The printer 12 performs printing by using CMYK components. For example, for each combination of CMYK components, a patch expressing the combination of CMYK components is printed on a recommended sheet according to the target. The color of each patch printed on the recommended sheet is measured by using a colorimeter, and the Lab value for each patch is obtained. The measured color value (that is, the Lab value) of each patch on the recommended sheet is compared with the Lab value that is determined in the target and that corresponds to the CMYK components corresponding to the patch. On the basis of the comparison result, the print properties of the printer 12 are evaluated. For example, a color conversion profile corresponding to the differences between the measured Lab values and the Lab values determined in the target may be set to the printer 12.

In a second application example, a recommended sheet, which has a color closer to the white color determined in the target, is used to evaluate the print properties of the printer 12. That is, the difference between the color of the recommended sheet and the white color determined in the target is included in the allowable range. Thus, compared with the case in which the print properties of the printer 12 are evaluated by using a sheet having a color whose difference from the white color determined in the target falls out of the allowable range, the print properties of the printer 12 are evaluated by using a sheet having a color closer to the white color determined in the target.

A larger difference between the color of a sheet, which is used in evaluation of the print properties of the printer 12, and the white color determined in the target may cause the accuracy of the evaluation to be degraded by a larger degree. In the second application example, a recommended sheet having a color closer to the white color determined in the target is used to evaluate the print properties of the printer 12, suppressing or avoiding degradation in accuracy of the evaluation.

For example, in the case where the difference between the color of the first sheet, which is selected by a user for use, and the white color determined in the target, which is selected by the user for use, falls out of the allowable range, the accuracy of evaluation of the print properties may be degraded. Use of a recommended sheet causes the degradation in accuracy to be suppressed or avoided.

As described above, the target may be changed in accordance with the first sheet, or a target suitable for the first sheet may be recommended.

Figure 15:
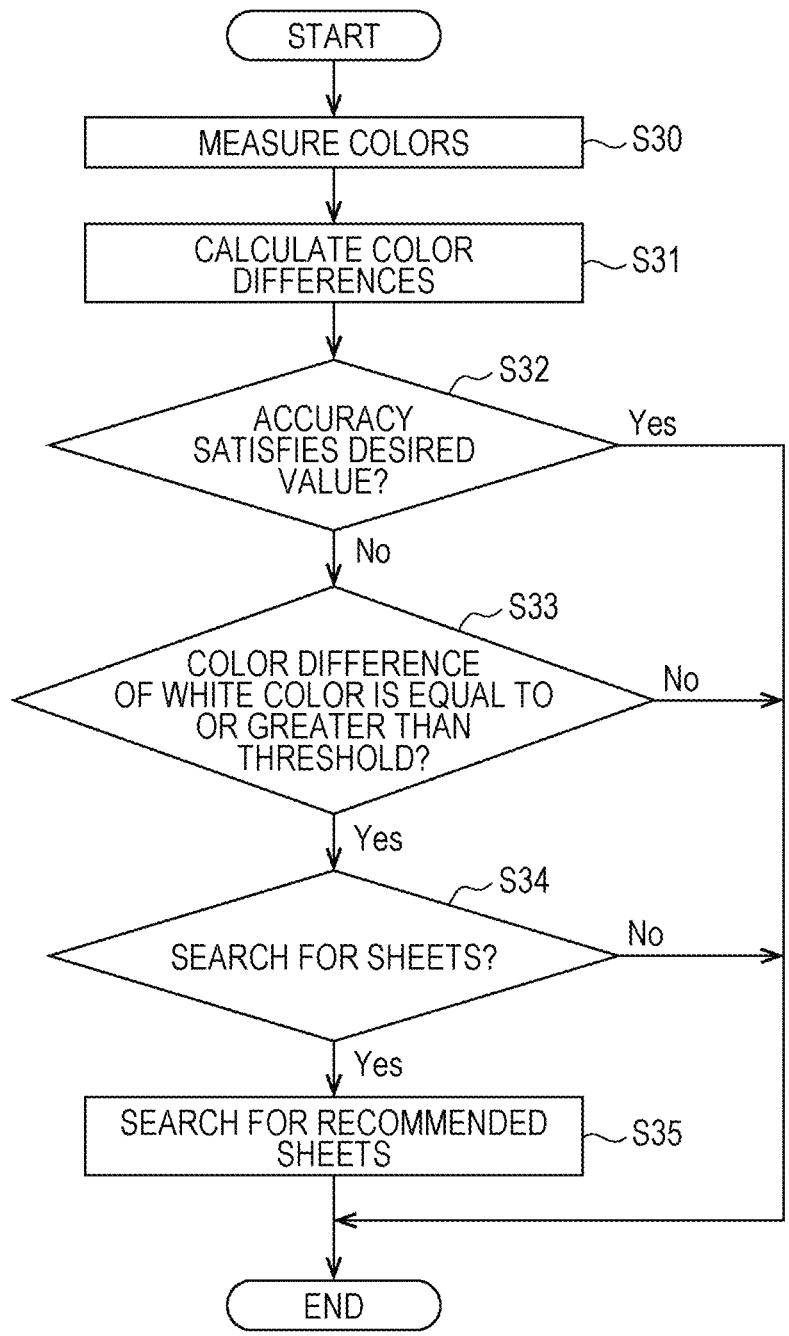
FIG. 15 is a flowchart of a process according to a modified example.

As a modified example of the second application example, in the case where the first sheet is used to evaluate the print properties of the printer 12, if the accuracy in evaluation is not good, or if the difference between the color of the first sheet and the white color determined in the target is large, recommended sheets may be presented to a user. Referring to FIG. 15, this process will be described below. FIG. 15 is a flowchart of a process according to the modified example.

According to the color determined in the target, the printer 12 prints multiple patches on the first sheet selected by a user.

The patches printed on the first sheet are measured by using a colorimeter (S30). Thus, the color values (for example, the Lab values) of the patches are obtained.

The processor 20 calculates the difference (that is, the color difference) between the measured color value of each patch and the color value of the patch which is determined in the target (S31).

The accuracy of the color differences calculated in step S31 satisfies a desired value (Yes in S32), the process ends.

In this case, no recommended sheets are presented to the user. The user uses the first sheet to evaluate the print properties of the printer 12.

If the accuracy of the color differences calculated in step S31 does not satisfy the desired value (No in S32), and if the difference between the color of the first sheet and the white color determined in the target is not equal to or greater than a threshold (No in S33), the process ends. That is, if the difference is less than the threshold, the process ends. In this case, no recommended sheets are presented to the user. The user uses the first sheet to evaluate the print properties of the printer 12.

If the difference between the color of the first sheet and the white color determined in the target is equal to or greater than the threshold (Yes in S33), and if the user does not transmit an instruction to search for recommended sheets (No in S34), the process ends. In this case, no recommended sheets are presented to the user. The user uses the first sheet to evaluate the print properties of the printer 12.

If the user transmits an instruction to search for recommended sheets (Yes in S34), recommended sheets are searched for (S35). For example, recommended sheets are searched for according to the flowcharts illustrated in FIGS. 4 and 6.

As in the modified example, after evaluation using the first sheet, recommended sheets may be presented to the user.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a display; and
    a processor, coupled to the display and configured to:
        acquire a visible property of a first sheet and an invisible property of the first sheet and forming capability information of forming an image on the first sheet;
        determine the first sheet being unusable for forming the image based on the visible property and the invisible property of the first sheet and the forming capability information; and
        in response to a determination of the first sheet being unusable for forming the image, present, to a user on the display, a second sheet obtained on a basis of a visible property and an invisible property of the second sheet, the second sheet being different from the first sheet, the second sheet being recommended to replace the first sheet to record the image output by the processor.

2. The information processing apparatus according to claim 1,
    wherein the processor is configured to
        present, to the user, the second sheet having a property whose difference from the visible property falls in a first allowable range and having a property whose difference from the invisible property falls in a second allowable range.

3. The information processing apparatus according to claim 2,
    wherein the processor is further configured to
        present, to the user, the second sheet having a color whose difference from a white color determined in a target falls in a third allowable range, the target being predetermined to perform comparison with the first sheet.

4. The information processing apparatus according to claim 3,
    wherein the target is used to evaluate a print property of a printer on a basis of a difference between a first color and a second color, the first color being a color of an image printed on the first sheet by the printer, the second color being determined in the target.

5. The information processing apparatus according to claim 1,
    wherein the invisible property is a property about capability of a printer.

6. The information processing apparatus according to claim 2,
    wherein the invisible property is a property about capability of a printer.

7. The information processing apparatus according to claim 3,
    wherein the invisible property is a property about capability of a printer.

8. The information processing apparatus according to claim 4,
    wherein the invisible property is a property about capability of the printer.

9. The information processing apparatus according to claim 1,
    wherein the visible property comprises either or both of a weight of the first sheet and a type of the first sheet, and
    wherein the invisible property comprises smoothness of the first sheet.

10. The information processing apparatus according to claim 2,
    wherein the visible property comprises either or both of a weight of the first sheet and a type of the first sheet, and
    wherein the invisible property comprises smoothness of the first sheet.

11. The information processing apparatus according to claim 3,
    wherein the visible property comprises either or both of a weight of the first sheet and a type of the first sheet, and
    wherein the invisible property comprises smoothness of the first sheet.

12. The information processing apparatus according to claim 4,
wherein the visible property comprises either or both of a weight of the first sheet and a type of the first sheet, and
wherein the invisible property comprises smoothness of the first sheet.

13. The information processing apparatus according to claim 1,
wherein the processor is further configured to
provide a user interface for setting allowable ranges for differences from properties of the first sheet and searching for the second sheet having properties included in the allowable ranges, the properties of the first sheet including the visible property and the invisible property.

14. The information processing apparatus according to claim 2,
wherein the processor is further configured to
provide a user interface for setting allowable ranges for differences from properties of the first sheet and searching for the second sheet having properties included in the allowable ranges, the properties of the first sheet including the visible property and the invisible property.

15. The information processing apparatus according to claim 3,
wherein the processor is further configured to
provide a user interface for setting allowable ranges for differences from properties of the first sheet and searching for the second sheet having properties included in the allowable ranges, the properties of the first sheet including the visible property and the invisible property.

16. The information processing apparatus according to claim 4,
wherein the processor is further configured to
provide a user interface for setting allowable ranges for differences from properties of the first sheet and searching for the second sheet having properties included in the allowable ranges, the properties of the first sheet including the visible property and the invisible property.

17. The information processing apparatus according to claim 5,
wherein the processor is further configured to
provide a user interface for setting allowable ranges for differences from properties of the first sheet and searching for the second sheet having properties included in the allowable ranges, the properties of the first sheet including the visible property and the invisible property.

18. The information processing apparatus according to claim 6,
wherein the processor is further configured to
provide a user interface for setting allowable ranges for differences from properties of the first sheet and searching for the second sheet having properties included in the allowable ranges, the properties of the first sheet including the visible property and the invisible property.

19. The information processing apparatus according to claim 7,
wherein the processor is further configured to
provide a user interface for setting allowable ranges for differences from properties of the first sheet and searching for the second sheet having properties included in the allowable ranges, the properties of the first sheet including the visible property and the invisible property.

20. A non-transitory computer readable medium storing a program causing a computer to execute a process comprising:
acquiring a visible property of a first sheet and an invisible property of the first sheet and forming capability information of forming an image on the first sheet;
determining the first sheet being unusable for forming the image based on the visible property and the invisible property of the first sheet and the forming capability information; and
in response to a determination of the first sheet being unusable for forming the image, presenting, to a user on a display, a second sheet obtained on a basis of a visible property of a first sheet and an invisible property of the second sheet, the second sheet being different from the first sheet, the second sheet being recommended to replace the first sheet to record the image.

* * * * *